(12) United States Patent
Blizard et al.

(10) Patent No.: US 12,127,016 B2
(45) Date of Patent: *Oct. 22, 2024

(54) PROVIDING CONFIGURATION UPDATES TO WIRELESS TELECOMMUNICATION NETWORKS

(71) Applicant: T-Mobile USA, Inc., Bellevue, WA (US)

(72) Inventors: Benjamin Matthew Blizard, Snoqualmie, WA (US); Matthew Lawrence Miller, Bellevue, WA (US); Tod Shepherd, Mount Pleasant, SC (US); Andrew Hemmerlein, Seattle, WA (US); Anand Injeti, Plano, TX (US); Harika Nagilla, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,333

(22) Filed: May 31, 2023

(65) Prior Publication Data

US 2023/0319600 A1 Oct. 5, 2023

Related U.S. Application Data

(63) Continuation of application No. 17/553,682, filed on Dec. 16, 2021, now Pat. No. 11,765,604.

(51) Int. Cl.
*H04W 24/02* (2009.01)
*H04L 41/082* (2022.01)
*H04L 41/0869* (2022.01)

(52) U.S. Cl.
CPC ........... *H04W 24/02* (2013.01); *H04L 41/082* (2013.01); *H04L 41/0869* (2013.01)

(58) Field of Classification Search
CPC ........................... H04L 63/061; H04L 9/0891
See application file for complete search history.

(56) References Cited

U.S. PATENT DOCUMENTS 5,754,857 A 5/1998 Gadol
6,101,423 A 8/2000 Csipkes et al.
(Continued)

FOREIGN PATENT DOCUMENTS

CN 105940447 B 3/2020
DE 102017124206 A1 4/2018
(Continued)

*Primary Examiner* — Zhiren Qin
(74) *Attorney, Agent, or Firm* — Perkins Coie LLP

(57) ABSTRACT

The system obtains an indication of a configuration update to perform on a component of a network and an indication of the component associated with the network. The configuration update is performed in multiple stages, including a pre-check stage, a configuration stage, and a verification stage. In the pre-check stage, the system obtains a parameter and an expected value of the parameter associated with the component. The system determines whether the component satisfies the expected value of the parameter by obtaining a value of the parameter associated with the component and comparing the obtained value to the expected value. Upon determining that the component satisfies the expected value of the parameter, the system performs the configuration stage. Upon performing the configuration update, the system performs the verification stage by testing whether the component is functioning. Upon determining that the component is functioning, the system provides the configuration update to UEs.

20 Claims, 7 Drawing Sheets

(56) References Cited

U.S. PATENT DOCUMENTS

| | | |
|---|---|---|
| 7,739,308 B2 | 6/2010 | Baffier et al. |
| 8,046,755 B2 | 10/2011 | Gaa-frost et al. |
| 8,112,771 B2 | 2/2012 | Bernabeu-auban et al. |
| 8,555,273 B1 | 10/2013 | Chia et al. |
| 8,914,314 B2 | 12/2014 | Newnham et al. |
| 8,914,674 B2 | 12/2014 | Shah et al. |
| 8,959,633 B1 | 2/2015 | Dokey et al. |
| 9,301,177 B2 | 3/2016 | Ballantyne et al. |
| 9,600,513 B2 | 3/2017 | Bourbonnais et al. |
| 9,639,870 B2 | 5/2017 | Keshkamat et al. |
| 9,934,119 B2 | 4/2018 | Grieco et al. |
| 9,992,064 B1 * | 6/2018 | Chawla ............... H04L 41/082 |
| 9,996,694 B2 | 6/2018 | Sethumadhavan et al. |
| 10,212,034 B1 | 2/2019 | Carranza Giotto et al. |
| 10,339,128 B2 | 7/2019 | Jurowicz et al. |
| 10,339,500 B2 | 7/2019 | Hussam |
| 10,572,472 B2 | 2/2020 | Crane |
| 10,678,528 B1 | 6/2020 | Acheson et al. |
| 10,694,024 B1 | 6/2020 | Mcdole et al. |
| 10,748,072 B1 | 8/2020 | Seeger et al. |
| 10,839,389 B1 | 11/2020 | Cron et al. |
| 10,891,140 B1 | 1/2021 | Levin et al. |
| 10,928,453 B2 | 2/2021 | Vinson et al. |
| 11,006,268 B1 | 5/2021 | Kim et al. |
| 11,018,695 B1 | 5/2021 | Zhang et al. |
| 11,070,301 B2 | 7/2021 | Su et al. |
| 11,119,754 B1 | 9/2021 | Sun et al. |
| 2002/0072956 A1 | 6/2002 | Willems et al. |
| 2005/0198382 A1 | 9/2005 | Salmi et al. |
| 2010/0228603 A1 | 9/2010 | Bolder et al. |
| 2011/0010543 A1 | 1/2011 | Schmidt et al. |
| 2016/0142292 A1 * | 5/2016 | Au ..................... H04L 5/0007 370/352 |
| 2019/0205761 A1 | 7/2019 | Wu et al. |
| 2020/0104118 A1 | 4/2020 | Lai et al. |
| 2020/0286051 A1 | 9/2020 | Kade et al. |
| 2020/0394226 A1 | 12/2020 | Xing et al. |
| 2021/0065128 A1 | 3/2021 | Shao et al. |
| 2021/0250262 A1 | 8/2021 | Ghouse Mohaddin |
| 2021/0281209 A1 | 9/2021 | Vinson et al. |

FOREIGN PATENT DOCUMENTS

| | | |
|---|---|---|
| EP | 1977400 A1 | 10/2008 |
| EP | 2224634 B1 | 8/2016 |
| EP | 3451240 A1 | 3/2019 |
| EP | 3554651 A2 | 10/2019 |
| JP | 2019149185 A | 9/2019 |
| WO | 2011026409 A1 | 3/2011 |
| WO | 2013059517 A1 | 4/2013 |
| WO | 2018208277 A1 | 11/2018 |
| WO | 2019138399 A1 | 7/2019 |
| WO | 2020177732 A1 | 9/2020 |
| WO | 2020188269 A1 | 9/2020 |
| WO | 2021057064 A1 | 4/2021 |

* cited by examiner

PROVIDING CONFIGURATION UPDATES TO WIRELESS TELECOMMUNICATION NETWORKS

CROSS-REFERENCE TO RELATED APPLICATIONS

This application is a continuation of U.S. patent application Ser. No. 17/553,682, filed on Dec. 16, 2021, entitled PROVIDING CONFIGURATION UPDATES TO WIRELESS TELECOMMUNICATION NETWORKS, which is hereby incorporated by reference in its entirety.

BACKGROUND

Implementing robust configuration updates for modern wireless telecommunication networks is a challenging problem. Currently available network automation tools have limited options to gracefully handle large-scale wireless telecommunication networks. In addition, the currently available network automation tools poorly handle situations when something goes wrong during the configuration update.

BRIEF DESCRIPTION OF THE DRAWINGS

Detailed descriptions of implementations of the present invention will be described and explained through the use of the accompanying drawings.

Figure 1:
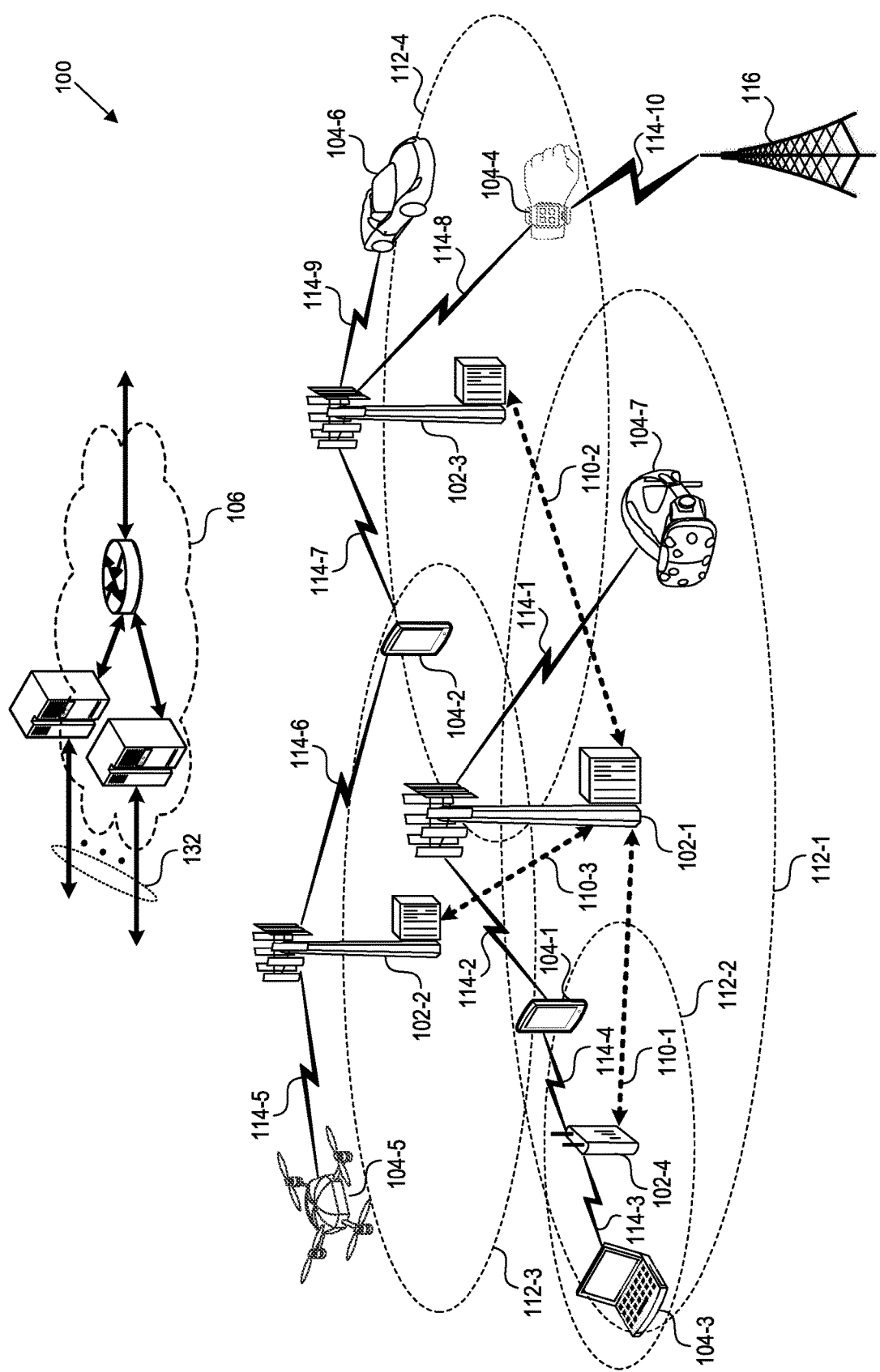
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein is a system and method to efficiently update at least a portion of a wireless telecommunication network. The system can obtain an indication of a configuration update to perform on a device associated with a wireless telecommunication network and an indication of the device associated with the wireless telecommunication network. The indication of the configuration update can include multiple stages defining an order in which to perform the configuration update. The multiple stages can include a pre-check stage, a configuration stage, and a verification stage. Breaking down the configuration update of the wireless telecommunication network into multiple stages enables detection of failure and reversal of a failed update prior to releasing the changes into production.

In the pre-check stage, the system can obtain a parameter and an expected value of a parameter associated with the device. For example, the parameter can include a network interface. The expected value of the parameter can include a type of network interface such as Standard Ethernet Version 2 (en), IEEE 802.3 (et), Token-ring (tr), Serial Line Internet Protocol (SLIP), Loopback (lo), Fiber Distributed Data Interface (FDDI), Serial Optical (so), ATM (at), Point-to-Point Protocol (PPP), or Virtual IP Address (vi). The expected value of the parameter can indicate that the network interface needs to be available. The system can determine whether the device satisfies the expected value of the parameter by obtaining a value of the parameter associated with the device and comparing the obtained value to the expected value.

Upon determining that the device satisfies the expected value of the parameter, the system can perform the configuration stage by performing the configuration update. Upon performing the configuration update, the system can perform the verification or validation stage by testing whether the device is functioning. Upon determining that the device is functioning, the system can put the configuration update into production by providing the configuration update to user equipment (UE).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. A small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively small geographic area and can allow unrestricted access by wireless devices that have service subscriptions with the network 100 provider. A femto cell covers a relatively small geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
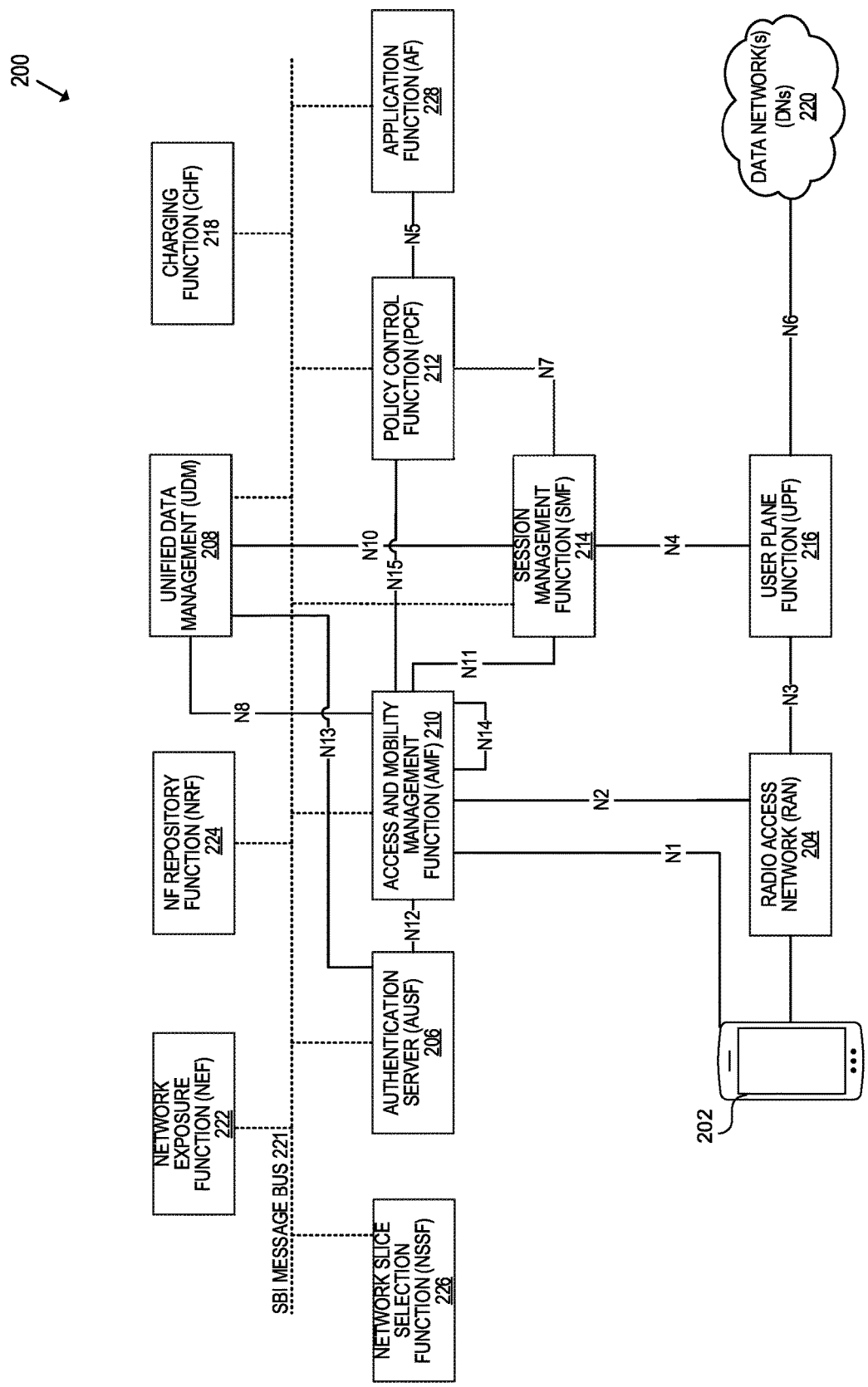
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a radio access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS) in that it provides authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Service (QoS) and charging rules, includes Network Slice selection, which is regulated by the NSSF 226.

Providing Configuration Updates to Wireless Telecommunication Networks

Figure 3:
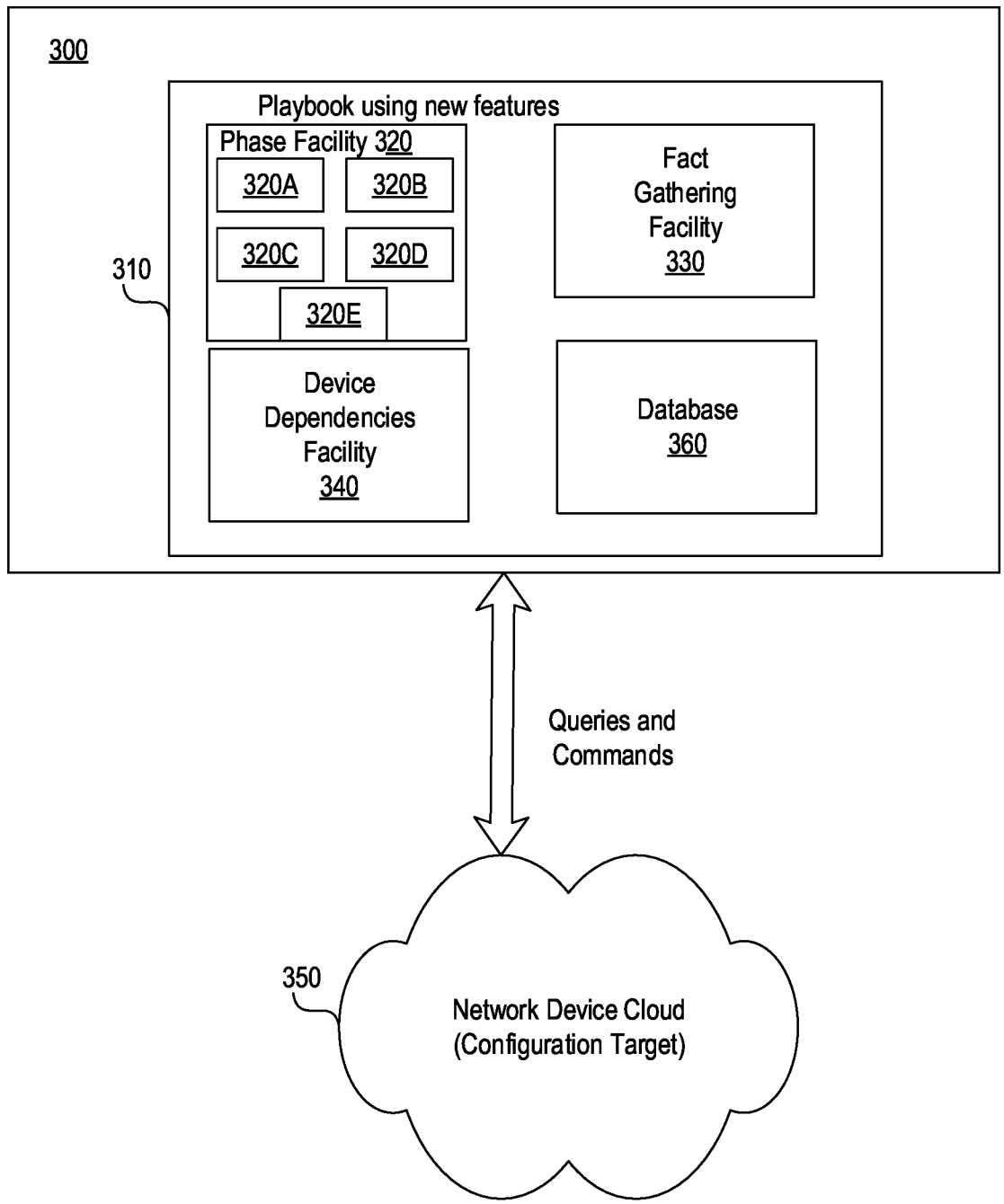
FIG. 3 shows an overview of the system to provide configuration updates to telecommunication networks.

FIG. 3 shows an overview of the system to provide configuration updates to telecommunication networks. Implementing robust configuration updates for modern networks is a challenging problem. The configuration update can be performed using an existing platform 300, such as Ansible. The platform 300 provides a playbook 310, which enables the definition of stages (or phases) 320, fact gathering facility 330, and device dependencies facility 340, all of which enable queries and commands to be communicated between the platform 300 and the wireless telecommunication network 350 that needs to be updated. The wireless telecommunication network 350 can be the network 100 in FIG. 1 or can be a portion of the network 100.

The definition of stages 320 can include five stages: pre-check 320A, configuration or implementation 320B, verification 320C, rollback 320D, and rollback post-check 320E. Pre-check stage 320A validates that the wireless telecommunication network 350 is properly configured to receive the configuration update. For example, the pre-check stage 320A can verify that the network 350 is responsive. If the network 350 passes the pre-check stage 320A, the system proceeds to the configuration or implementation stage 320B.

The configuration or implementation stage 320B implements the configuration update. The verification stage 320C checks that that the configuration stage 320B was successful and that the network 350 is stable and functioning properly. The verification stage 320C can automatically run a suite of tests on the network 350 to ensure proper functioning of the network 350. If the verification stage 320C validates the network 350, the rollback and rollback post-check stages are not performed.

If the network 350 does not pass the verification stage, the system performs the rollback stage 320D, which reverts the configuration changes and puts the configuration back to the network state that existed prior to initiating the pre-check stage 320A. In the rollback post-check stage 320E, the system confirms that the network state after the reversion matches the network state that existed prior to performing the pre-check 320A. The rollback post-check stage 320E is similar to the pre-check stage 320A.

Fact gathering facility 330 gathers the configuration information about the network and the devices in the network. For example, the fact gathering facility 330 can gather the configuration information during the pre-check stage 320A on the devices that are undergoing the upgrade and store the configuration information in a database 360. That way, if the configuration update fails, the rollback post-check stage 320E can retrieve the stored configuration information and can check that the network configuration after the reversion matches the configuration information stored in the database 360. The system can perform fact gathering during the pre-check stage 320A, after the configuration stage 320B, and after the rollback stage 320D. The database 360 can store configuration information for each device in the network 350. The system can query the database 360 about a specific device and the specific configuration of the device.

Device dependencies facility 340 determines device interdependencies in the network 350. For example, if device A undergoes a configuration upgrade and device B depends on device A, that means that device B should also undergo the configuration upgrade. Specifically, a configuration upgrade does not necessarily upgrade all of the devices in the network 350. Instead, only a subset of devices in the network 350 can be upgraded. The devices in the network can be individual devices, can be grouped into pairs, or can be gathered into larger groups.

To determine which devices can be upgraded, the user can specify the devices to upgrade, or the system can automatically determine the devices to upgrade. For example, the user can specify a single device A to upgrade to a 5G network, and the system, based on the device dependencies, can upgrade all the devices dependent on device A. Similarly, if a configuration update fails for device A, the rollback stage 320D can revert the configuration for device A and all the devices that depend on device A. For example, two devices A and B can be dependent upon each other if the two devices share common configuration or provide backup configuration for each other, such as if device B is a failover device for device A.

In addition to information on device configuration, the database 360 can also store information about requested configuration updates. Sometimes multiple configuration updates can occur one after the other, and instead of performing a subsequent configuration update after having the preceding configuration update fail, the system can check the database to determine whether the subsequent configuration update should be attempted. If the preceding configuration update has failed, the system can remove the indication of the requested update from the database, so that when the request for the subsequent configuration update is received, the system will not perform the subsequent configuration update. Alternatively, the database can store both the configuration update request and an indication that the configuration update has failed.

Figure 4:
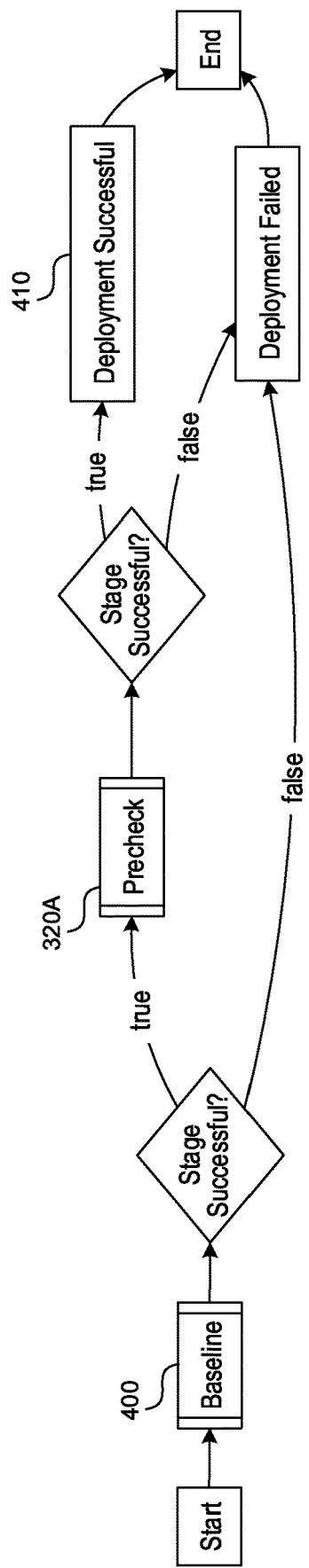
FIG. 4 is a flowchart of a pre-check stage.

FIG. 4 is a flowchart of a pre-check stage 320A. The pre-check stage checks whether the network 350 in FIG. 3 is configured as expected and ready to receive a configuration update. No configuration updates are made during the pre-check stage 320A.

In step 400, the system can gather configuration information about the devices involved in the configuration update. Once the configuration information is gathered, the system can store the configuration information in the database 360 in FIG. 3. If the pre-check stage 320A is successful, the system in step 410 proceeds to subsequent stages. If pre-check stage 320A is not successful, the system determines that the deployment of the configuration update has failed.

A pre-check stage 320A can check whether a parameter exists and whether the parameter is within the expected range. For example, the configuration update can configure an interface on a network device. The interface can be a port on the network device, such as an ethernet port. The pre-check stage 320A can check whether the configuration file describing the hardware properties of the network device has the ethernet port. If the ethernet port does not exist, the pre-check stage 320A fails. Further, the pre-check stage 320A can check whether the ethernet port is in use. If the ethernet port is in use, the pre-check stage 320A fails.

Figure 5:
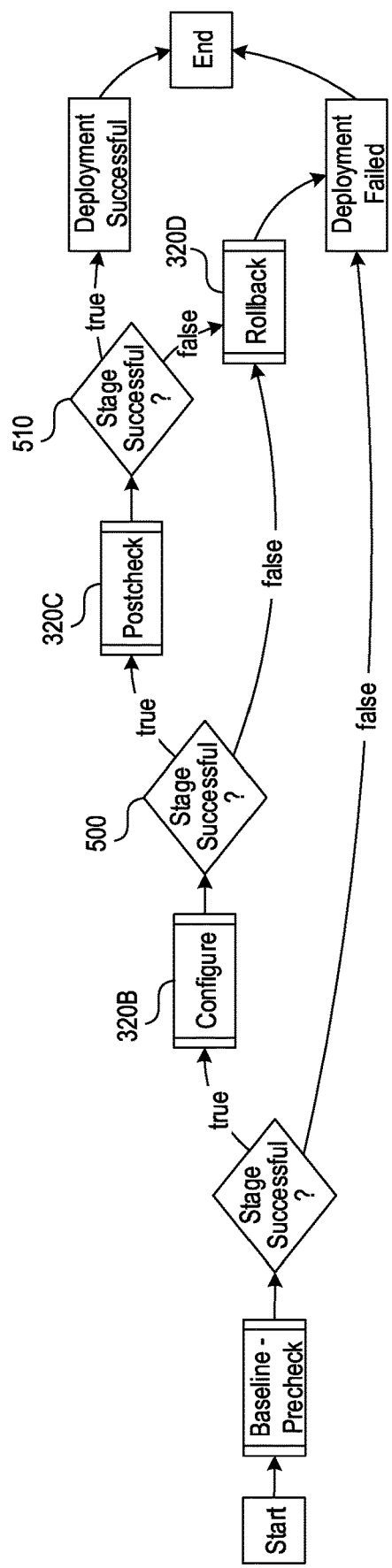
FIG. 5 is a flowchart of a configuration stage.

FIG. 5 is a flowchart of a configuration stage 320B. In the configuration stage 320B, the system performs the network configuration. In step 500, the system can check whether all the processes in the configuration stage 320B have been successfully completed. If the configuration stage 320B does not complete successfully, the system determines that the deployment was unsuccessful and goes to the rollback stage 320D.

If all the processes have successfully completed, the system proceeds to the verification stage 320C. In step 510, the system determines whether the verification stage 320C has successfully completed. If the verification stage 320C is successful, the system determines that the configuration update was successful. If the verification stage 320C does not complete successfully, the system determines that the deployment was unsuccessful and goes to the rollback stage 320D.

An example of a configuration update that can be performed is adding a new virtual local area network (VLAN) interface to a router in the network 350 in FIG. 3. Often, users need to add a new VLAN interface to routers and add a new IP address associated with the VLAN.

Another example of a configuration update is an access list. The access list controls which traffic can come in and which traffic can go out of a network 350 in FIG. 3. A configuration update can alter those lists to add permissions or revoke permissions associated with particular IP addresses or network. A configuration update can change routing to redirect an incoming network packet to go to a device with a particular IP address or advertised network.

A configuration update can add an entirely new network to the overall network 350 to expand its size to support additional 5G traffic. For example, a configuration update can upgrade a portion of the network to offer 5G services such as 5G Non-Standalone (NSA). Often a new ipv4/ipv6 network needs to be created, advertised to remaining portion of network 350 and configured on router interfaces to support additional 5G hardware and its subsequent traffic.

Figure 6:
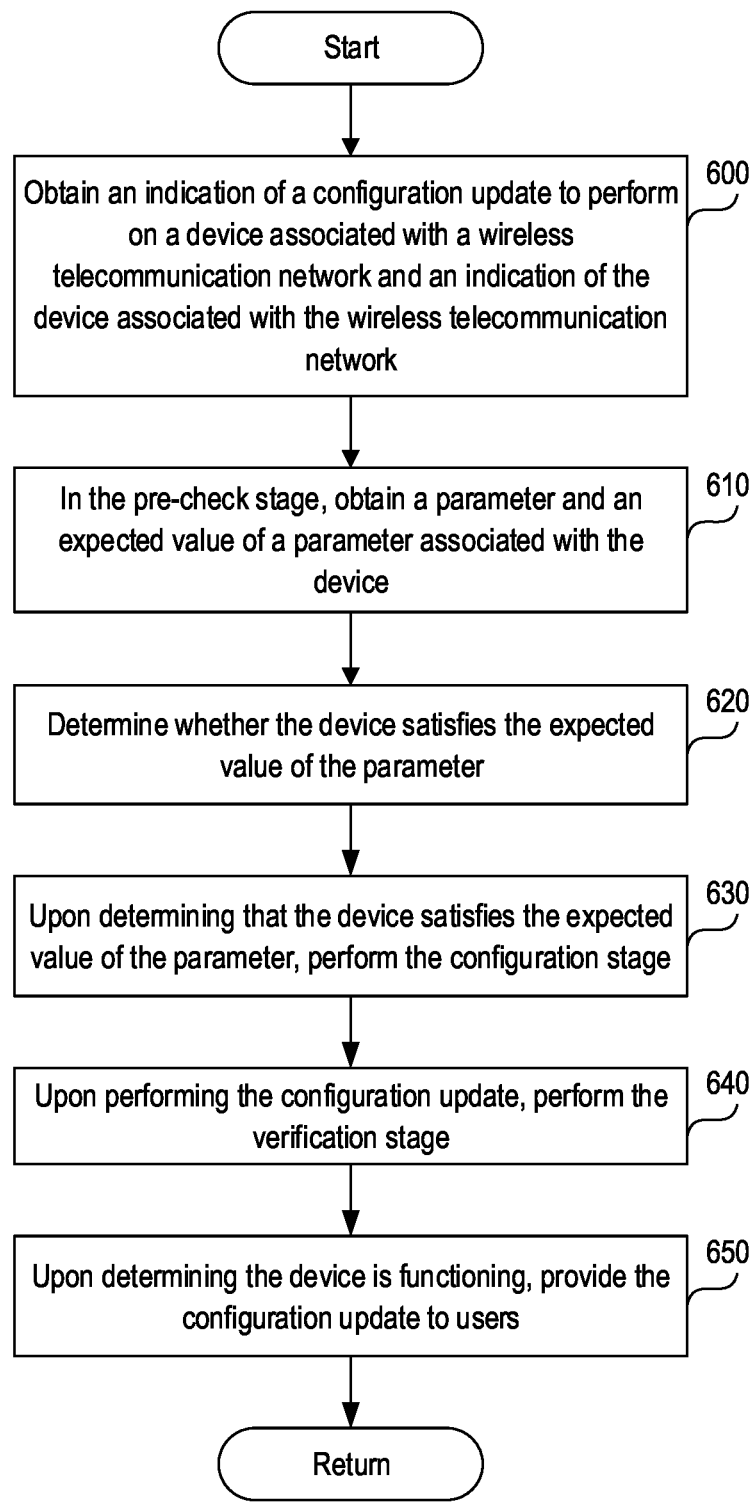
FIG. 6 is a flowchart that illustrates a process to efficiently update at least a portion of a wireless telecommunication network.

FIG. 6 is a flowchart that illustrates a process to efficiently update at least a portion of a wireless telecommunication network. In step 600, a hardware or software processor executing instructions described in this application can obtain an indication of a configuration update to perform on a device associated with a wireless telecommunication network and an indication of the device associated with the wireless telecommunication network. The indication of the configuration update includes multiple stages defining an order in which to perform the configuration update. The multiple stages include a pre-check stage, a configuration stage, a verification stage, and optionally a rollback stage and a post-check stage. The device associated with the wireless telecommunication network can be a component of the wireless telecommunication network, such as a base station, the core network, a sector, an antenna, a wireless device, etc.

In step 610, the processor can perform the pre-check stage to determine whether the component is in an expected state in the pre-check stage. The expected state can include a parameter and an expected value of the parameter. For example, the processor can obtain a parameter and an expected value of the parameter associated with the device. In a more specific example, the parameter can indicate a network interface, and the expected value of the parameter can indicate a specific type of the network interface such as Standard Ethernet Version 2 (en), IEEE 802.3 (et), Token-ring (tr), Serial Line Internet Protocol (SLIP), Loopback (lo), Fiber Distributed Data Interface (FDDI), Serial Optical (so), ATM (at), Point-to-Point Protocol (PPP), or Virtual IP Address (vi).

In step 620, the processor can determine whether the device satisfies the expected value of the parameter by obtaining a value of the parameter associated with the device and comparing the obtained value to the expected value. For example, if the expected operating system (OS) version of the device is A, but the actual OS version of the device is B the processor can determine that the pre-check stage has failed. In addition, the expected value can indicate whether the network interface is available. For example, if the network interface is of the appropriate type but the network interface is not available, the processor can determine that the pre-check stage has failed.

In step 630, upon determining that the device satisfies the expected value of the parameter, the processor can perform the configuration stage by performing the configuration update.

In step 640, upon performing the configuration update, the processor can perform the verification stage by testing whether the device is functioning.

In step 650, upon determining that the device is functioning, the processor can provide the configuration update to UEs. Upon failing to verify functionality associated with the device, the processor can perform the rollback stage by restoring the state of the component to the expected state. Upon restoring the state of the component, the processor can perform the post-check stage by ensuring that the state of the component matches the expected state.

The processor can determine device dependencies within the network. For example, a device B can depend on device A, and if device A fails to update, then device B should not update. The processor can take dependencies into account when rolling back all or some of the group of devices defined by the dependences. The processor can automatically determine device dependencies. The processor can obtain a dependency among multiple devices associated with the telecommunication network, where the multiple devices include the device and a second device. The dependency indicates a dependent functionality among the multiple devices. Upon determining that the device is not functioning, the processor can revert the device and the second device to a state that existed prior to commencement of the configuration update.

The processor can detect duplicate configuration update requests and can also remove a configuration update request if the configuration update is unsuccessful. Upon obtaining the indication of a configuration update, the processor can store the indication of the configuration update in a database. The processor can receive a second indication of the configuration update. The processor can determine whether the database includes the indication of the configuration update that is the same as the second indication of the configuration update. Upon determining that the database includes the indication of the configuration update, the processor can disregard the second indication of the configuration update. Upon determining that the device is not functioning, the processor can remove the indication of the configuration update from the database.

The processor can gather facts about the configuration of the devices in the network. Upon obtaining the value of the parameter associated with the device, the processor can store the value of the parameter and the parameter in a database. Upon determining that the device is not functioning, the processor can retrieve from the database the value of the parameter. The processor can revert the parameter to the retrieved value of the parameter. The processor can check whether the parameter of the device matches the value of the parameter.

The processor can gather facts about the network environment. Upon obtaining a configuration update request, the processor can gather information about the network environment in which the device is located. The processor can store the value of the environment parameters associated with the device in a database.

The processor can update the database for each device after fact gathering. After completing a stage among the multiple stages, the processor can obtain the value of the parameter associated with the device. The processor can store the value of the parameter associated with the device in a database.

The processor can perform the configuration update as well as rollbacks based on device dependencies. The processor can obtain a dependency among multiple devices associated with the telecommunication network, where the multiple devices include the device and a second device. The dependency indicates a dependent functionality among the multiple devices. Upon receiving the indication to perform the configuration update on the device, the processor can determine that the second device and the device have the dependency. The processor can perform the configuration update on the device and the second device.

The processor can send notifications to business users. Upon performing configuration update processor can update database and send notifications to business users with status of configuration update.

Computer System

Figure 7:
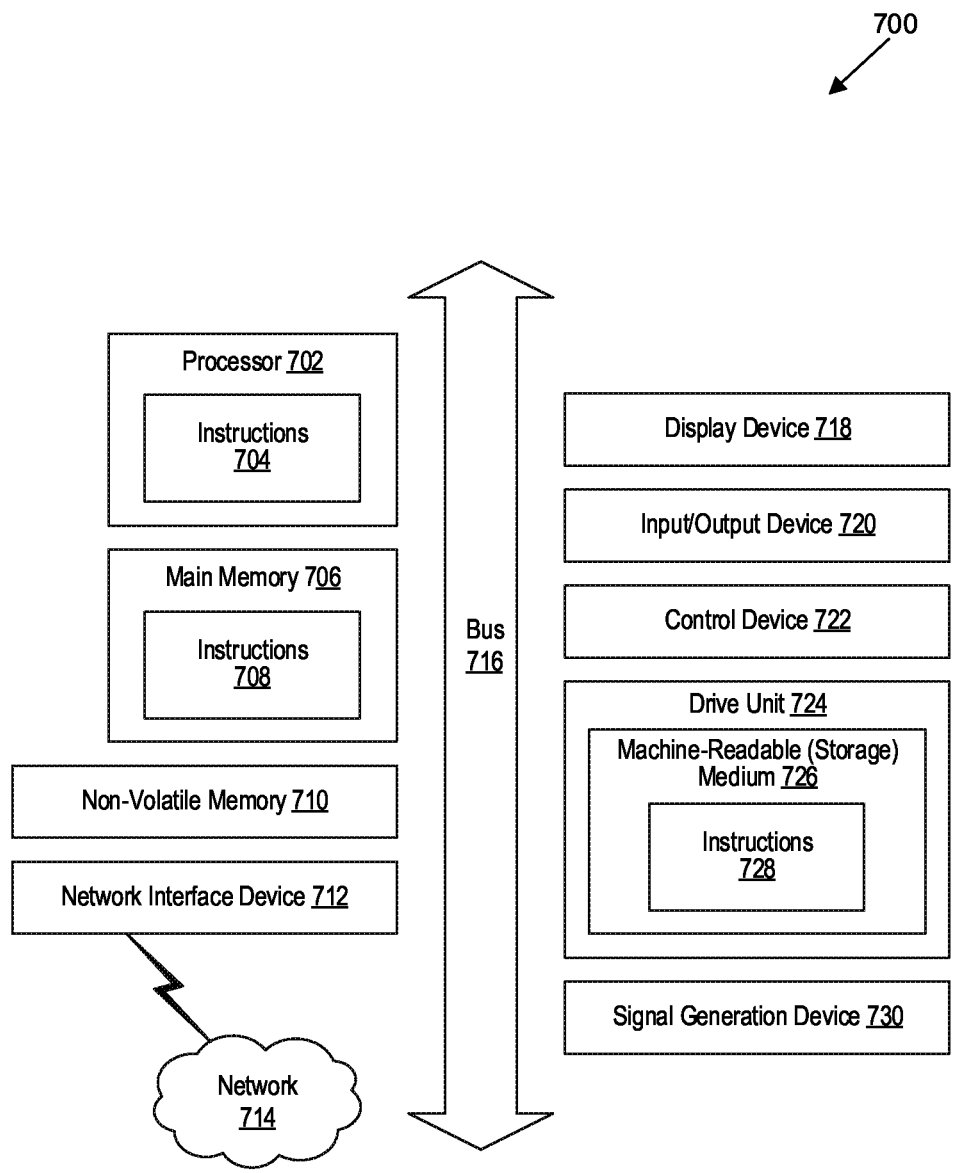
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730, all of which are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can have an architecture similar to that of a server computer, a personal computer (PC), a tablet computer, a mobile telephone, a game console, a music player, a wearable electronic device, a network-connected ("smart") device (e.g., a television or home assistant device), an AR/VR system (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it may include one or more cloud components in one or more networks. Where appropriate, one or more computer systems 700 can perform operations in real time, near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable (storage) medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected" or "coupled" or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples, such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include elements additional to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory, computer-readable storage medium comprising instructions recorded thereon that, when executed by at least one data processor of a system of a wireless telecommunications network, cause the system to:
obtain an indication of a configuration update to perform on a component associated with a network,
  wherein the configuration update is performed in multiple stages, including a pre-check stage, a configuration stage, and a verification stage;
in the pre-check stage, obtain a parameter and an expected value of the parameter associated with the component;
determine whether the component satisfies the expected value of the parameter by obtaining a value of the parameter associated with the component and comparing the obtained value to the expected value;
upon determining that the component satisfies the expected value of the parameter, perform the configuration stage by performing the configuration update;
upon performing the configuration update, perform the verification stage by testing whether the component is functioning; and
upon determining that the component is not functioning, rollback the configuration update.

2. The non-transitory, computer-readable storage medium of claim 1, comprising instructions to:
obtain a dependency among multiple components associated with the network,
  wherein the multiple components include the component and a second component, and
  wherein the dependency indicates a dependent functionality among the multiple components; and
upon determining that the component is not functioning, revert the component and the second component to a state that existed prior to commencement of the configuration update.

3. The non-transitory, computer-readable storage medium of claim 1, comprising instructions to:
upon obtaining the indication of the configuration update, store the indication of the configuration update in a database;
receive a second indication of the configuration update;
determine whether the database includes the indication of the configuration update that matches the second indication of the configuration update;
upon determining that the database includes the indication of the configuration update, disregard the second indication of the configuration update; and
upon determining that the component is not functioning, remove the indication of the configuration update from the database.

4. The non-transitory, computer-readable storage medium of claim 1, comprising instructions to:
upon obtaining the value of the parameter associated with the component, store the value of the parameter and the parameter in a database;
upon determining that the component is not functioning, retrieve from the database the value of the parameter;
revert the parameter associated with the component to the retrieved value of the parameter; and
check whether the parameter of the component matches the retrieved value of the parameter.

5. The non-transitory, computer-readable storage medium of claim 1, comprising instructions to:
upon obtaining the indication of the configuration update, store the indication of the configuration update in a database;
receive a second indication of the configuration update;
determine whether the database includes the indication of the configuration update that matches the second indication of the configuration update; and upon determining that the database includes the indication of the configuration update, disregard the second indication of the configuration update.

6. The non-transitory, computer-readable storage medium of claim 1, comprising instructions to:
obtain a dependency among multiple components associated with the network,
  wherein the multiple components include the component and a second component, and
  wherein the dependency indicates a dependent functionality among the multiple components;
upon receiving the indication of the configuration update to perform on the component, determine that the second component and the component have the dependency; and
perform the configuration update on the component and the second component.

7. The non-transitory, computer-readable storage medium of claim 1, wherein the parameter value includes a Standard Ethernet Version 2 (en), IEEE 802.3 (et), Token-ring (tr), Serial Line Internet Protocol (SLIP), Loopback (lo), Fiber Distributed Data Interface (FDDI), Serial Optical (so), ATM (at), Point-to-Point Protocol (PPP), or Virtual IP Address (vi).

8. A method comprising:
obtaining an indication of a configuration update to perform on a component associated with a network, and multiple stages associated with the configuration update including a pre-check stage, a configuration stage, and a verification stage;
in the pre-check stage, obtaining a parameter and an expected value of the parameter associated with the component;
determining whether the component satisfies the expected value of the parameter by obtaining a value of the parameter associated with the component and comparing the obtained value to the expected value;
upon determining that the component satisfies the expected value of the parameter, performing the configuration stage by performing the configuration update;
upon performing the configuration update, performing the verification stage by testing whether the component is functioning; and
upon determining that the component is not functioning, rolling back the configuration update.

9. The method of claim 8, comprising:
obtaining a dependency among multiple components associated with the network,
  wherein the multiple components include the component and a second component, and
  wherein the dependency indicates a dependent functionality among the multiple components; and
upon determining that the component is not functioning, reverting the component and the second component to a state that existed prior to commencement of the configuration update.

10. The method of claim 8, comprising:
upon obtaining the indication of the configuration update, storing the indication of the configuration update in a database;
receiving a second indication of the configuration update;
determining whether the database includes the indication of the configuration update that matches the second indication of the configuration update;
upon determining that the database includes the indication of the configuration update, disregarding the second indication of the configuration update; and
upon determining that the component is not functioning, removing the indication of the configuration update from the database.

11. The method of claim 8, comprising:
upon obtaining the value of the parameter associated with the component, storing the value of the parameter and the parameter in a database;
upon determining that the component is not functioning, retrieving from the database the value of the parameter;
reverting the parameter associated with the component to the retrieved value of the parameter; and
checking whether the parameter of the component matches the retrieved value of the parameter.

12. The method of claim 8, comprising:
upon obtaining the indication of the configuration update, storing the indication of the configuration update in a database;
receiving a second indication of the configuration update;
determining whether the database includes the indication of the configuration update that matches the second indication of the configuration update; and
upon determining that the database includes the indication of the configuration update, disregarding the second indication of the configuration update.

13. The method of claim 8, comprising:
obtaining a dependency among multiple components associated with the network,
  wherein the multiple components include the component and a second component, and
  wherein the dependency indicates a dependent functionality among the multiple components;
upon receiving the indication of the configuration update to perform on the component, determining that the second component and the component have the dependency; and
performing the configuration update on the component and the second component.

14. A system comprising:
at least one hardware processor; and
at least one non-transitory memory storing instructions, which, when executed by the at least one hardware processor, cause the system to:
  obtain an indication of a configuration update to perform on a component associated with a network, and multiple stages associated with the configuration update including a pre-check stage, a configuration stage, and a verification stage;
  in the pre-check stage, obtain a parameter and an expected value of the parameter associated with the component;
  determine whether the component satisfies the expected value of the parameter by obtaining a value of the parameter associated with the component and comparing the obtained value to the expected value;
  upon determining that the component satisfies the expected value of the parameter, perform the configuration stage by performing the configuration update;
  upon performing the configuration update, perform the verification stage by testing whether the component is functioning; and
  upon determining that the component is not functioning, rollback the configuration update.

15. The system of claim 14, comprising instructions to:
obtain a dependency among multiple components associated with the network,
    wherein the multiple components include the component and a second component, and
    wherein the dependency indicates a dependent functionality among the multiple components; and
upon determining that the component is not functioning, revert the component and the second component to a state that existed prior to commencement of the configuration update.

16. The system of claim 14, comprising instructions to:
upon obtaining the indication of the configuration update, store the indication of the configuration update in a database;
receive a second indication of the configuration update;
determine whether the database includes the indication of the configuration update that matches second indication of the configuration update;
upon determining that the database includes the indication of the configuration update, disregard the second indication of the configuration update; and
upon determining that the component is not functioning, remove the indication of the configuration update from the database.

17. The system of claim 14, comprising instructions to:
upon obtaining the value of the parameter associated with the component, store the value of the parameter and the parameter in a database;
upon determining that the component is not functioning, retrieve from the database the value of the parameter;
revert the parameter associated with the component to the retrieved value of the parameter; and
check whether the parameter of the component matches the retrieved value of the parameter.

18. The system of claim 14, comprising instructions to:
upon obtaining the indication of the configuration update, store the indication of the configuration update in a database;
receive a second indication of the configuration update;
determine whether the database includes the indication of the configuration update that matches the second indication of the configuration update; and
upon determining that the database includes the indication of the configuration update, disregard the second indication of the configuration update.

19. The system of claim 14, comprising instructions to:
obtain a dependency among multiple components associated with the network,
    wherein the multiple components include the component and a second component, and
    wherein the dependency indicates a dependent functionality among the multiple components;
upon receiving the indication of the configuration update to perform on the component, determine that the second component and the component have the dependency; and
perform the configuration update on the component and the second component.

20. The system of claim 14, wherein the parameter value includes a Standard Ethernet Version 2 (en), IEEE 802.3 (et), Token-ring (tr), Serial Line Internet Protocol (SLIP), Loopback (lo), Fiber Distributed Data Interface (FDDI), Serial Optical (so), ATM (at), Point-to-Point Protocol (PPP), or Virtual IP Address (vi).

\* \* \* \* \*